United States Patent
Wei et al.

(10) Patent No.: US 9,798,552 B2
(45) Date of Patent: Oct. 24, 2017

(54) CLOUD COMPUTING ARCHITECTURE FOR MANAGING HARDWARE RESOURCES ON NETWORK ELEMENTS

(71) Applicant: Futurewei Technologies, Inc., Plano, TX (US)

(72) Inventors: An Wei, San Jose, CA (US); Kangkang Shen, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 14/800,401

(22) Filed: Jul. 15, 2015

(65) Prior Publication Data

US 2016/0019069 A1    Jan. 21, 2016

Related U.S. Application Data

(60) Provisional application No. 62/024,816, filed on Jul. 15, 2014.

(51) Int. Cl.
| | |
|---|---|
| *G06F 9/00* | (2006.01) |
| *G06F 15/177* | (2006.01) |
| *G06F 9/44* | (2006.01) |
| *G06F 9/455* | (2006.01) |
| *G06Q 30/00* | (2012.01) |
| *G06F 9/50* | (2006.01) |

(52) U.S. Cl.
CPC .......... *G06F 9/4408* (2013.01); *G06F 9/4401* (2013.01); *G06F 9/4416* (2013.01); *G06F 9/45533* (2013.01); *G06F 9/45558* (2013.01); *G06F 9/5061* (2013.01); *G06Q 30/018* (2013.01); *G06F 2009/45575* (2013.01)

(58) Field of Classification Search
CPC ........................................................ G06F 9/44
See application file for complete search history.

(56) References Cited

U.S. PATENT DOCUMENTS

| | | | |
|---|---|---|---|
| 8,516,481 B2 | 8/2013 | Broyles et al. | |
| 8,909,989 B2 | 12/2014 | Hou | |
| 9,424,089 B2* | 8/2016 | Gibbs | G06F 9/45508 |
| 2010/0235847 A1* | 9/2010 | Brehmer | G06F 9/5066 |
| | | | 719/328 |

(Continued)

FOREIGN PATENT DOCUMENTS

| | | |
|---|---|---|
| WO | 2013032442 A1 | 3/2013 |
| WO | 2013058768 A1 | 4/2013 |

OTHER PUBLICATIONS

Foreign Communication From a Counterpart Application, PCT Application No. PCT/US2015/040621, International Search Report dated Nov. 4, 2015, 5 pages.

(Continued)

*Primary Examiner* — Mohammed Rehman
(74) *Attorney, Agent, or Firm* — Conley Rose, P.C.

(57) ABSTRACT

A network element (NE) comprising a receiver configured to couple to a cloud network; and a multi-core central processing unit (CPU) coupled to the receiver and configured to receive a first partition configuration from an orchestration element, partition a plurality of processor cores into a plurality of processor core partitions according to the first partition configuration, and initiate a plurality of virtual basic input/output systems (vBIOSs) such that each vBIOS manages a processor core partition.

19 Claims, 10 Drawing Sheets

(56) References Cited

U.S. PATENT DOCUMENTS

| | | | |
|---|---|---|---|
| 2011/0161955 A1 | 6/2011 | Woller et al. | |
| 2011/0252179 A1* | 10/2011 | Cho | G06F 15/17343 |
| | | | 710/316 |
| 2011/0302400 A1* | 12/2011 | Maino | G06F 21/575 |
| | | | 713/2 |
| 2012/0011293 A1* | 1/2012 | Cheng | G06F 1/1632 |
| | | | 710/303 |
| 2012/0073000 A1* | 3/2012 | Sheu | G06F 21/88 |
| 2012/0158883 A1 | 6/2012 | Ikenaga | |
| 2012/0158967 A1 | 6/2012 | Sedayao et al. | |
| 2012/0303835 A1* | 11/2012 | Kempf | H04W 24/02 |
| | | | 709/235 |
| 2013/0060831 A1* | 3/2013 | Brignoli | G06F 9/546 |
| | | | 709/201 |
| 2013/0067209 A1* | 3/2013 | Hall | G06F 9/441 |
| | | | 713/2 |
| 2013/0151831 A1 | 6/2013 | Bealkowski et al. | |
| 2014/0149992 A1 | 5/2014 | Zimmer et al. | |
| 2014/0257591 A1* | 9/2014 | Cheng | G05D 7/0676 |
| | | | 700/300 |

OTHER PUBLICATIONS

Foreign Communication From a Counterpart Application, PCT Application No. PCT/US2015/040621, Written Opinion dated Nov. 4, 2015, 8 pages.

\* cited by examiner

CLOUD COMPUTING ARCHITECTURE FOR MANAGING HARDWARE RESOURCES ON NETWORK ELEMENTS

CROSS-REFERENCE TO RELATED APPLICATIONS

The present application claims the benefit of U.S. Provisional Patent Application No. 62/024,816 filed Jul. 15, 2014, by An Wei, et al., and entitled, "CLOUD FIRMWARE," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cloud computing refers to elastic provisioning of hardware for computer services, for example in one or more data centers, which may then be made available to users, for example over the Internet. The multiple dynamically provisioned hardware components form a cloud. Hardware resources of the cloud are shared between computer services for optimal performance. The computer services may include computation and data storage.

The cloud can be classified as private, public, and hybrid. A private cloud is operated solely for a single organization. The private cloud may be managed internally or by a third-party, and may comprise security mechanisms to maintain data integrity. A public cloud is open for public use and may be accessed by a large number of users without significant security safeguards. A hybrid cloud is a combination of at least one private cloud and at least one public cloud. A private cloud architecture and a public cloud architecture may be substantially similar. However, security considerations may be substantially different for computer services operating on both the private cloud architecture and the public cloud architecture.

SUMMARY

In one embodiment, the disclosure includes a network element (NE) comprising a receiver configured to couple to a cloud network; and a multi-core central processing unit (CPU) coupled to the receiver and configured to receive a first partition configuration from an orchestration element, partition a plurality of processor cores into a plurality of processor core partitions according to the first partition configuration, and initiate a plurality of virtual basic input/output systems (vBIOSs) such that each vBIOS manages a processor core partition.

In another embodiment, the disclosure includes a method implemented in an orchestration element, the method comprising launching a transient operating system environment, determining a first cloud computing configuration, communicating with a plurality of NEs in a cloud to discover available hardware resources on the NEs, and communicating with the NEs to launch a plurality of physical basic input/output system (pBIOSs) on the NEs such that the pBIOSs manage the available hardware resources to implement the first cloud computing configuration.

In yet another embodiment, the disclosure includes a method implemented in a NE, the method comprising receiving a partition configuration from an orchestration element, partitioning locally available hardware resources into a plurality of partitions according to the partition configuration, and initiating a plurality of vBIOSs such that each vBIOS manages all hardware resources assigned to an associated partition.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
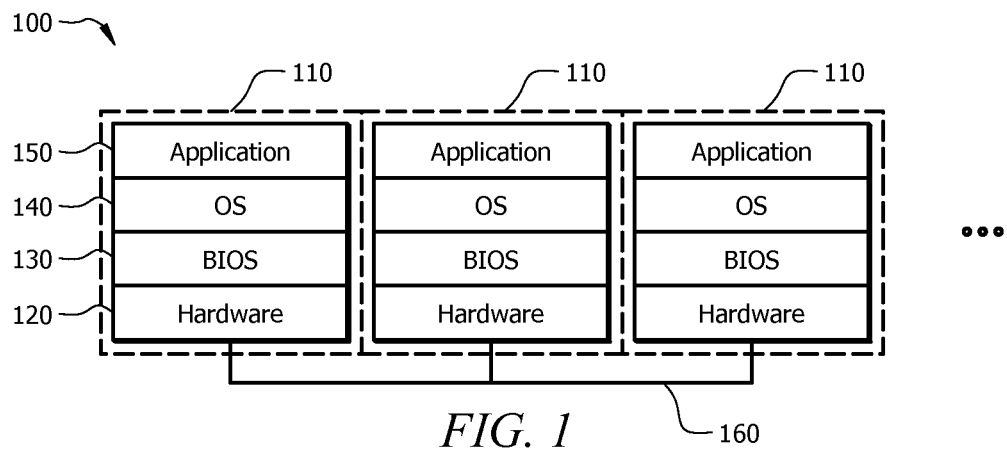
FIG. 1 is a schematic diagram of a cloud computing architecture.

FIG. 1 is a schematic diagram of a cloud computing architecture 100. The cloud computing architecture 100 comprises a plurality of computers 110 interconnected with connections 160. The cloud computing architecture 100 may be configured as shown or in any other suitable manner.

Each computer 110 is divided into four layers functionally. The layers comprise a hardware layer 120, a basic input/output system (BIOS) layer 130, an operating system (OS) layer 140, and an application layer 150. In the hardware layer 120, the computer 110 provides hardware resources such as CPUs (e.g. processors), which may comprise a plurality of processor cores. In the BIOS layer 130, the computer 110 operates a BIOS firmware program configured to determine a total amount of available hardware resources in the computer 110 and inform an OS of the total amount of the available hardware resources upon startup. In the OS layer 140, the OS operates on each of the computers 110. For example, an OS may be a WINDOWS® OS or a LINUX® OS. The OSs of the plurality of computers 110 communicate with each other via computer 110 hardware. Different computers 110 may operate by employing different OSs. In the application layer 150, the computer 110 executes an application by employing the OS of the computer 110. The application may be any computer program configured to provide a service to a user. Since all the available hardware resources in the computer 110 are assigned to execute the application, some of the available hardware resources may be wasted when the application does not need all the available hardware resources in order to operate.

The connections 160 are configured to connect the hardware of the plurality of computers 110. In some examples, the connections 160 may be physical connections such as fiber optic links and/or electrical links. In some examples, the connections 160 may be wireless or virtual links.

Figure 2:
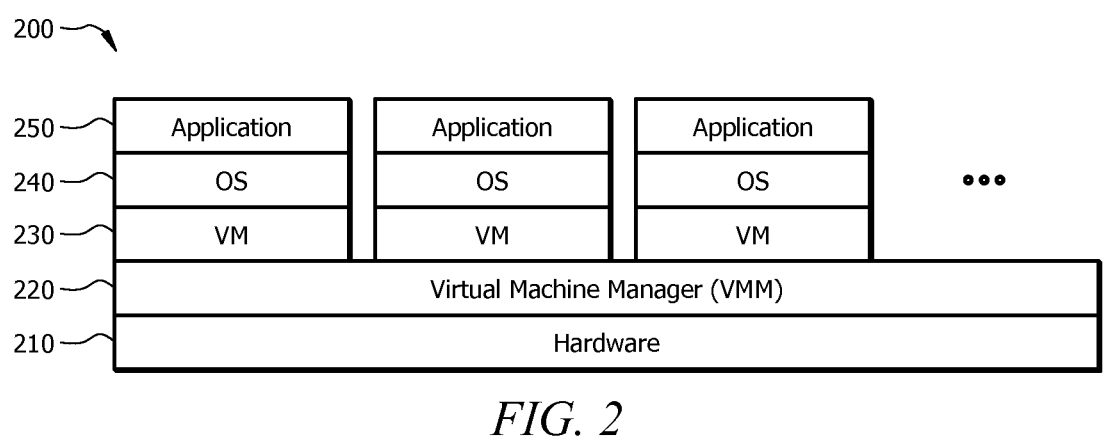
FIG. 2 is a schematic diagram of another cloud computing architecture.

FIG. 2 is a schematic diagram of another cloud computing architecture 200. The cloud computing architecture 200 is divided into five layers functionally. The layers comprise a hardware layer 210, a virtual machine manager (VMM) layer 220, a virtual machine layer 230, an OS layer 240, and an application layer 250. The cloud computing architecture 200 may be configured as shown or in any other suitable manner. For example, the cloud computing architecture 200 may be distributed over a plurality of computers, such as computers 110, and/or implemented in a single computer.

In the hardware layer 210, one or more pieces of hardware are configured to provide hardware resources. For example, the hardware may comprise CPUs, storage devices, and control boards. The hardware may be interconnected as computing cloud, which may allow the hardware to be dynamically provisioned as needed to serve a plurality of applications.

In the VMM layer 220, a VMM program creates a plurality of virtual machines (VMs) and manages each VM by assigning appropriate hardware resources to each VM. Different VMs may support different OSs and are connected via the hardware resources. The utilization of a VMM program to create a plurality of VMs for supporting different OSs is referred to as virtualization technology. In the VM layer 230, the plurality of VMs support OSs using the hardware resources assigned by the VMM. The VMM layer 220 and the VM layer 230 are collectively referred to as a virtualization layer. The OS layer 240 and the application layer 250 are similar to the OS layer 140 and the application layer 150, respectively.

Figure 3:
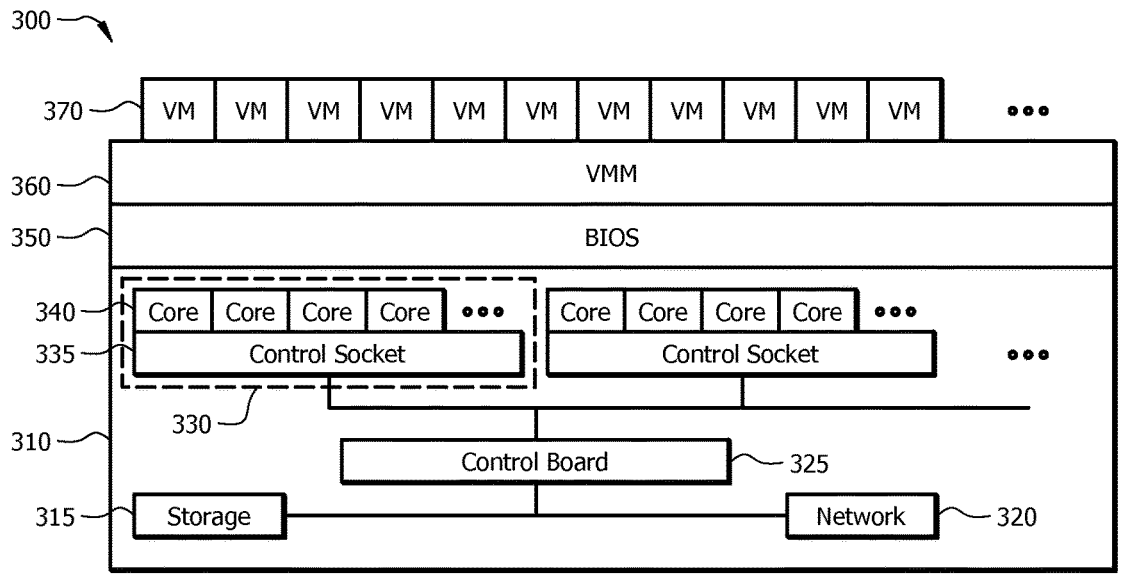
FIG. 3 is a schematic diagram of yet another cloud computing architecture.

FIG. 3 is a schematic diagram of yet another cloud computing architecture 300. The cloud computing architecture 300 is divided into four layers functionally. The layers comprise a hardware layer 310, a BIOS layer 350, a VMM layer 360, and a VM layer 370. The cloud computing architecture 300 is configured as shown or in any other suitable manner. For example, the cloud computing architecture 300 may be distributed over a plurality of computers, such as computers 110, and/or implemented in a single computer.

The hardware layer 310 comprises a storage 315 (e.g. a hard disk or other memory), a network 320 (e.g. transmitters receivers, links, etc.) and a control board 325 coupled to the storage 315 and the network 320. The hardware layer 310 further comprises a plurality of CPUs 330 coupled to the control board 325. The storage 315, the network 320, the control board 325, and the CPUs 330 may be configured in any manner known to a person of ordinary skill in the art.

The storage 315 is a storage unit including one or more disks, tape drives, and/or solid-state drives and may be used as an over-flow data storage device, to store programs when such programs are selected for execution, and to store instructions and data that are read during program execution. The network 320 is configured to enable communication between the cloud computing architecture 300 and other cloud computing architectures. The control board 325 is configured to manage the communications between the plurality of CPUs 330, the storage 315, the network 320, and/or other hardware.

Each CPU 330 comprises a control socket 335 and a plurality of processor cores 340. The control socket 335 is configured to control and manage the plurality of processor cores 340. Each processor core 340 is a processing unit which receives instructions from the control socket 335 and executes the instructions. The BIOS layer 350, the VMM layer 360, and the VM layer 370 are similar to the BIOS layer 130, the VMM layer 220, and the VM layer 230, respectively.

Compared with the cloud computing architecture 100 in FIG. 1, the cloud computing architecture 200 in FIG. 2 and the cloud computing architecture 300 in FIG. 3 are advantageous in terms of resources sharing and application and/or OS migration as the VMM allows resources to be dynamically allocated as needed. However, as the number of the processor cores increase, the VMM's ability to manage the hardware resources for different applications is degraded accordingly. Therefore, a need exists for a cloud computing architecture which supports continuous scalability of computing capacity. Additionally, besides isolation and connectivity, the OS layer and the virtualization layer introduce latency and complexity in the cloud, and pose challenges to construct an efficient and effective cloud computing architecture. Therefore, the cloud computing architecture may eliminate the OS layer (e.g., the OS layer 140, 240) and the virtualization layer (e.g., the VMM layer 220, 360 and the VM layer 230, 370) to achieve a lightweight flexible cloud computing architecture with low latency, low complexity, and high efficiency. Such cloud computing architecture may be employed in data centers.

Disclosed herein are various embodiments for managing hardware resources in a cloud computing architecture. A firmware including a virtual BIOS (vBIOS) is dynamically created to designate and partition available hardware resources for use by an application in a multi-processor environment in a cloud computing architecture. In one embodiment, an orchestration element is in communication with the cloud computing architecture and is located in a remote node separate from the node(s) implementing the cloud computing architecture. The orchestration element creates the firmware and loads the firmware into a storage element of the node(s) implementing the cloud computing architecture when the cloud computing architecture and/or associated nodes are booted. A control board on each node of the cloud computing architecture launches a local copy of the vBIOS of the firmware (e.g. received from the orchestration element) to manage and/or partition the available hardware resources for operating application(s). In another embodiment, the orchestration element is distributed across a plurality of nodes that implement the cloud computing architecture. The control boards of the nodes each contain the functionality of the orchestration element, which communicate with each other to create the firmware including the vBIOS and launch the vBIOS to manage and partition the available hardware resources for operating the application(s). In addition, the firmware manages the local processing, network, and storage resources in the cloud computing architecture. The firmware is suitable for scale-out cloud computing architectures. Moreover, the firmware saves virtualization software cost, provides high reliability, and improves performance by eliminating OS layers and VMM layers of cloud computing architectures.

Figure 4:
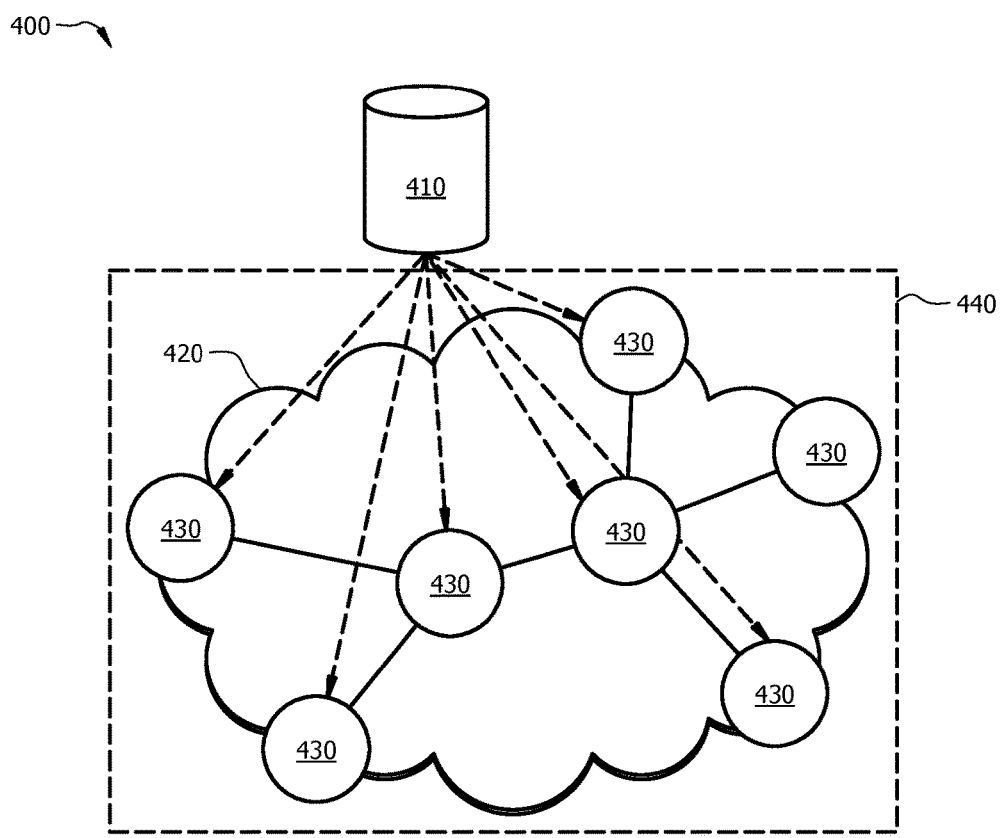
FIG. 4 is a schematic diagram of a cloud computing network according to an embodiment of the disclosure.

FIG. 4 is a schematic diagram of a cloud computing network 400 according to an embodiment of the disclosure. The cloud computing network 400 comprises an orchestration element 410 and a plurality of computing nodes 430. The plurality of computing nodes 430 are interconnected with connections 420 and form a computing cloud 440. The cloud computing network 400 may be configured as shown or in any other suitable manner.

The orchestration element 410 is configured to manage hardware resources of the computing cloud 440 and manage hardware resources of the plurality of computing nodes 430 dynamically by assigning the hardware resources to various applications in response to hardware resource requests. Each computing node 430 is configured to operate one or more of the various applications with the hardware resources assigned by the orchestration element 410. The connections 420 that interconnect the plurality of computing nodes 430 shown in FIG. 4 may be logical connections or physical connections. The hardware resources of computing nodes 430 may comprise a plurality of CPUs (e.g., the CPUs 330) or other resources (e.g., storage drives, network resources, etc.) in the computing cloud 440. The plurality of CPUs may be connected by fiber optic links, electrical links, and/or wireless links.

Figure 5:
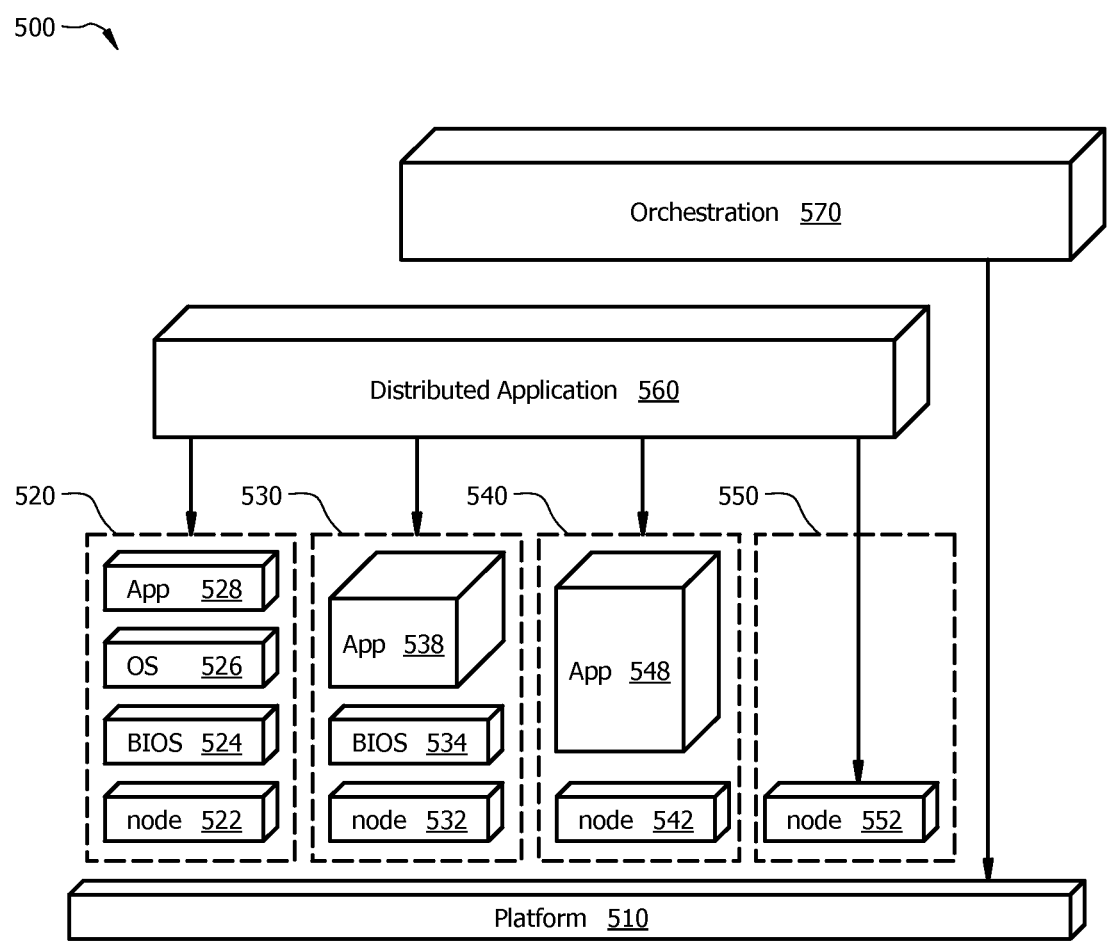
FIG. 5 is a schematic diagram of a cloud computing architecture according to an embodiment of the disclosure.

FIG. 5 is a schematic diagram of a cloud computing architecture 500 according to an embodiment of the disclosure. The cloud computing architecture 500 comprises a platform 510, a first computing subsystem 520, a second computing subsystem 530, a third computing subsystem 540, a fourth computing subsystem 550, a distributed application element 560, and an orchestration element 570. Cloud computing architecture 500 may be implemented in a network such as network 400. For example, the first computing subsystem 520, the second computing subsystem 530, the third computing subsystem 540, and the fourth computing subsystem 550 may be implemented in nodes such as nodes 430, the distributed application element 560 may operate on a plurality of nodes such as nodes 430, and the orchestration element 570 may be similar to orchestration element 410, respectively. In other embodiments, the cloud computing architecture 500 implements the orchestration element 570 in a distributed manner across the computing nodes (e.g. nodes 430). The cloud computing architecture 500 may be configured as shown or in any other suitable manner.

The platform 510 is similar to the computing cloud 440 and comprises hardware resources. The platform 510 supports heterogeneous computing subsystems. As shown in FIG. 5, the heterogeneous computing subsystems comprise the first computing subsystem 520, the second computing subsystem 530, the third computing subsystem 540, and the fourth computing subsystem 550.

The first computing subsystem 520 is similar to the computer 110. The first computing subsystem 520 is divided to four layers functionally, comprising a first node layer 522 (e.g. node 430), a first BIOS layer 524, a first OS layer 526, and a first application layer 528, which are similar to the hardware layer 120, the BIOS layer 130, the OS layer 140, and the application layer 150.

The second computing subsystem 530 is divided into three layers functionally, comprising a second node layer 532 (e.g. node 430), a second BIOS layer 534, and a second application layer 538, which are similar to the hardware layer 120, the BIOS layer 130, and the application layer 150. The second application layer 538 operates on the second BIOS layer 534 through a south-bound application programming interface (API) for resource management, monitoring, and orchestration so that resources can be managed, monitored, and provisioned directly by remote entities (e.g. the orchestration element 570), for example by employing OpenStack. The API enables an application to operate without an OS. Therefore, the second computing subsystem 530 does not comprise an OS layer (e.g., the OS layer 140).

The third computing subsystem 540 is divided into two layers functionally, comprising a third node layer 542 (e.g. node 430) and a third application layer 548, which are similar to the hardware layer 120 and the application layer 150. The third application layer 548 may operate on the third node layer 542 directly through a processor, a graphic processing unit (GPU), or a field programmable gate array (FPGA). Therefore, the third computing subsystem 540 comprises neither an OS layer (e.g., the OS layer 140) nor a BIOS layer (e.g., the BIOS layer 130).

The fourth computing subsystem 550 includes a computing node 552 (e.g. node 430) for computer acceleration. The computing node 552 in the fourth computing subsystem 550 is similar to the computing nodes in the first computing subsystem 520, in the second computing subsystem 530, and in the third computing subsystem 540. By adding the computing node 522, the fourth computing subsystem 550 can provide services such as migration, backup, and mirroring. It should be noted that the architecture 500 may comprise a plurality of the same type of node and/or may not include all nodes shown in some embodiments.

The distributed application element 560 is configured to communicate with the orchestration element 570 and operate as one or more distributed applications across the heterogeneous computing subsystems, for example, the first computing subsystem 520, the second computing subsystem 530, the third computing subsystem 540, and the fourth computing subsystem 550.

In one embodiment, the nodes 522, 532, 542, and 552 are in communication with the orchestration element 570, which is remotely located in a dedicated node. For example, the nodes 522, 532, 542, and 552 may each operate on a single chassis/computer. The orchestration element 570 may operate on another chassis/computer in a remote computing node. In another embodiment, the orchestration element 570 is distributed across the nodes 522, 532, 542, and 552. The orchestration element 570 is similar to the orchestration element 410 and is configured to manage hardware resources of the platform 510 by creating a firmware including vBIOSs for each of the various applications according to hardware resource requests from the distributed application element 560. The hardware resource requests from the distributed application element 560 indicate the hardware resources required for each individual application of the various applications.

In operation, the distribution application element 560 transmits hardware resource requests of the various applications to the orchestration element 570. In one embodiment, the orchestration element 570 is functionally included in each node of the cloud computing architecture 500. As such, the orchestration element 570 launches pBIOSs to determine the available hardware resources of each node of the platform 510 in response to the hardware resource requests. A pBIOS may be a firmware program, specific to a node, that is configured to test node hardware and boot node software. The orchestration element 570 further creates the firmware including a vBIOS for each of the various applications and designates a partition of the available hardware resources to be assigned to each one of the various applications. A vBIOS may be dynamically generated by BIOS firmware customized to boot a particular application on a particular partition of a node's hardware. The partition of the available hardware resources is a virtual partition of the available hardware resources. Finally, the orchestration element 570 launches the vBIOSs to manage the partitions of the available hardware resources for running the various applications.

In one embodiment, the orchestration element 570 is located remotely from the nodes 522, 532, 542, and 552. The orchestration element 570 transmits a request for the available hardware resources of the platform 510 to the nodes 522, 532, 542, and 552. A control board for each node of the platform 510 (e.g., such as control board 325) launches a local pBIOSs to determine the locally available hardware resources of each node of the platform 510 in response to the requests. The control boards then transmit messages indicating the available hardware resources to the orchestration element 570. Following receipt of the messages, the orchestration element 570 creates the firmware including a vBIOS for each one of the various applications and designates a partition of the available hardware resources of each node to be assigned to the each one of the various applications. The orchestration element 570 further transmits the firmware to each control board. Finally, the control boards launch the vBIOSs to manage the partitions of the available hardware resources for running the various applications. For both embodiments, the partitions of the available hardware resources correspond to the computing nodes in the first node layer 522 of the first computing subsystem 520, in the second node layer 532 of the second computing subsystem 530, in the third node layer 542 of the third computing subsystem 540, and in the fourth computing subsystem 550.

Figure 6:
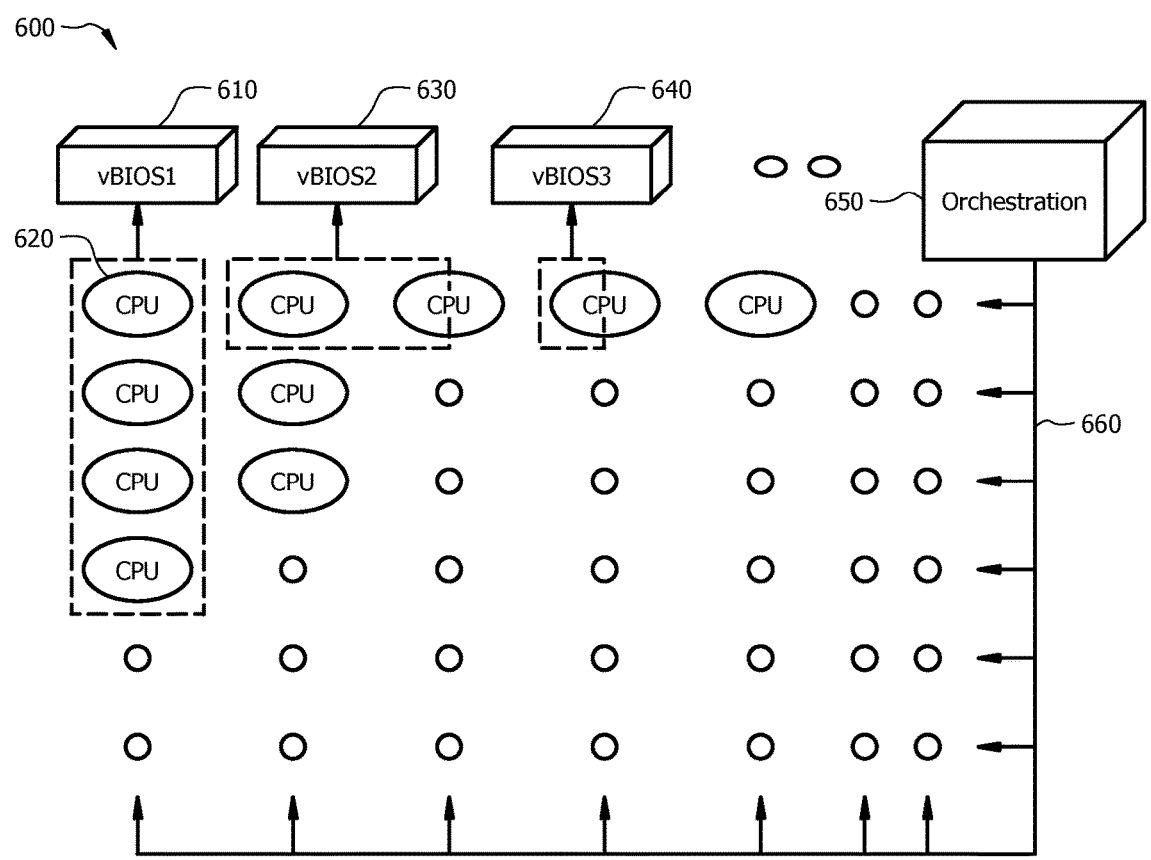
FIG. 6 is a schematic diagram of a method of vBIOSs allocation according to an embodiment of the disclosure.

FIG. 6 is a schematic diagram of a method 600 of vBIOSs allocation according to an embodiment of the disclosure. Method 600 may operate on a platform 660 and an orchestration element 650, which may be similar to platform 510 and orchestration element 570, respectively. The platform 660 comprises a plurality of nodes, such as nodes 430. The nodes comprise hardware resources, such as a plurality of CPUs 620. Following receipt of hardware resource requests, the orchestration element 650 creates firmware including a plurality of vBIOS 610, 630, and 640 for various applications. Each of the vBIOSs 610, 630, and 640 is assigned to appropriate hardware resources in a platform 660 according to the hardware resource requests. For example, each CPU 620 comprises one or more processor cores. Each vBIOS 610, 630, and 640 is therefore assigned to a minimum integer number of available processor cores, which provides the hardware resource requested in the hardware resource requests.

For example, each of the CPUs 620 may comprise eight processor cores. In addition, the hardware resource requests may indicate running a first application requires 32 processor cores of hardware resources, running a second application requires 11.5 processor cores of hardware resources, and running a third application requires 3.5 processor cores of hardware resources. Accordingly, the orchestration element 650 creates a first vBIOS (vBIOS1) 610 for a first application, which is assigned to four CPUs 620. The orchestration element 650 creates a second vBIOS (vBIOS2) 630 for a second application, which is assigned to 1.5 CPUs 620 or 12 processor cores. The orchestration element 650 creates a third vBIOS (vBIOS3) 640 for a third application, which is assigned to a half CPU 620, or four processor cores. Additional CPUs/cores may be assigned and/or reassigned to additional vBIOSs dynamically based on the needs of the applications requesting resources from the orchestration element 650.

Figure 7:
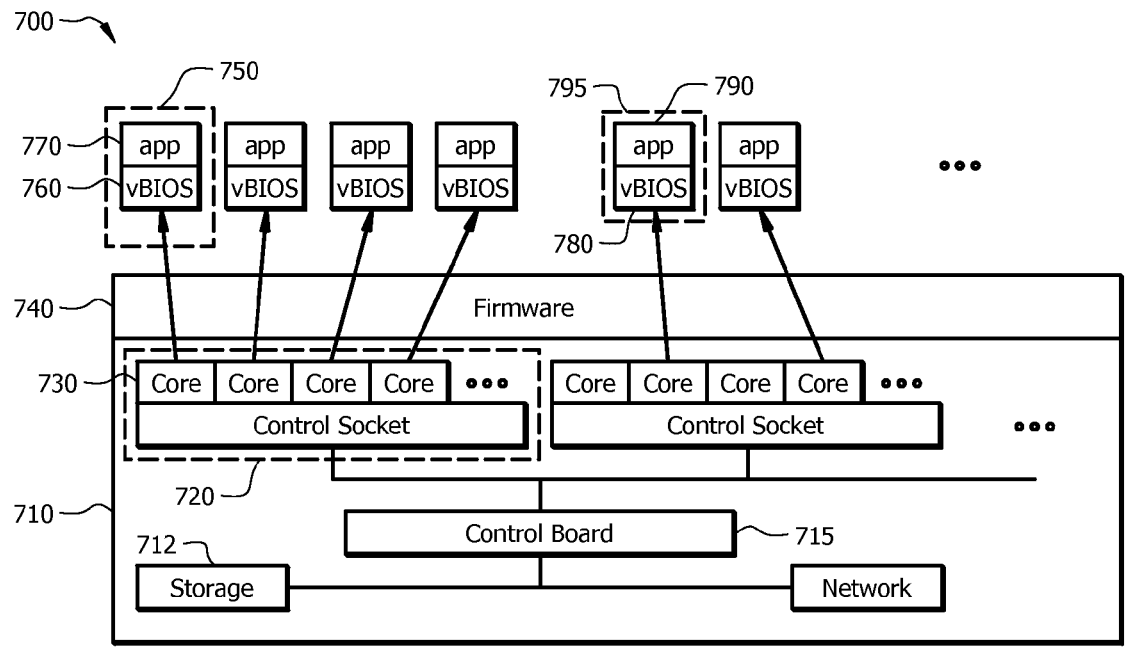
FIG. 7 is a schematic diagram of another cloud computing architecture according to an embodiment of the disclosure.

FIG. 7 is a schematic diagram of another cloud computing architecture 700 according to an embodiment of the disclosure. The cloud computing architecture 700 comprises a hardware layer 710 and a firmware layer 740, which may be similar to hardware layer 310 and BIOS layer 350, respectively. The hardware layer 710 and a firmware layer 740 may be implemented in a single node or distributed over a plurality of nodes, such as nodes 430. The cloud computing architecture 700 is also configured to load a plurality of computer subsystems 750 and 795, which may be similar to software and/or firmware portions of computing subsystems 520, 530, 540, and/or 550. The cloud computing architecture 700 is configured as shown or in any other suitable manner.

The hardware layer 710 comprises a plurality of CPUs 720, each of which comprises a plurality of processor cores 730. The hardware layer 710 further comprises network connections (e.g. a network), a control board 715, and a storage 712, which are similar to network 320, control board 325 and storage 315, respectively.

The control board 715 is similar to the control board described above. In the firmware layer 740, a firmware may be configured functionally as a BIOS (e.g., the BIOS in the BIOS layer 130) or a combination of the BIOS and a hypervisor. The firmware is similar to the firmware described above. The firmware may be directly connected to firmware of other computers/nodes in a private and/or public cloud.

In one embodiment, an orchestration element (e.g., the orchestration element 570) is located remotely from the cloud computing architecture 700. As a result, the orchestration element creates the firmware including the vBIOSs for the various applications and transmits the firmware to the control board 715 when the cloud computing architecture 700 is booted. The firmware is stored in the storage 712 after receipt by the control board 715 from the orchestration element. In one embodiment, the control board 715 includes functionalities of the orchestration element. As a result, the firmware including the vBIOSs for the various applications is created by the control board 715 and stored in the storage 712 after creation by the control board 715.

Each of the computer subsystems 750 and 795 is divided functionally to a vBIOS layer 760 and 780 and an application layer 770 and 790, respectively. The vBIOS layers 760 and 780 may comprise vBIOSs such as vBIOS 610, 630, and/or 640. The application layer 770 may comprise local or distributed applications such as distributed application element 560. For example, in a first vBIOS layer 760 of a first computer subsystem 750, a first partition of the hardware resources is provided to support a first application after a first vBIOS is launched in a first vBIOS layer 760. For another example, in a second vBIOS layer 780 of a second computer subsystem 795, a second partition of the hardware resources is provided to support a second application after a second vBIOS is launched in a second vBIOS layer 780. As shown, the first partition of the hardware resources comprises one processor core 730. The second partition of the hardware resources comprises two processor cores 730. Accordingly, the processor cores 730 may belong to the same CPU 720, but may be distributed to different vBIOS via the partitions set up by the orchestration element. In an embodiment, a group of processor cores 730 may belong to different CPUs 720.

In practice, the partition of the hardware resources is provided via apportioned and/or discrete containers or VMs through a cloud management layer. The cloud management layer may be executed as a part of the firmware, or an extension of the firmware in communication with a remote module. In one embodiment, the remote module is the orchestration element (e.g., the orchestration element 570). The remote module may be coupled to one or more cloud computing architectures using the enhanced firmware technology.

The application layers 770 and 790 of the computer subsystems 750 and 795 operate directly on the vBIOS layers 760 and 780, respectively, with or without an OS layer. The application that operates in the application layers 770 and 790 may be any computer program. For example, the application may be an application that operates on VM or a software container.

Figure 8:
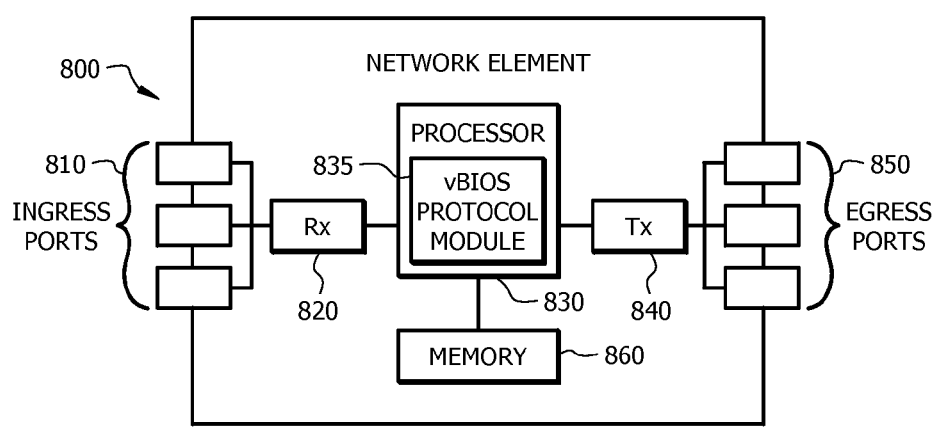
FIG. 8 is a schematic diagram of a NE device.

FIG. 8 is a schematic diagram of a network element (NE) device 800. The NE device 800 is suitable for implementing the disclosed embodiments, including the orchestration element 410 570, and 650, any of nodes 430, 520, 530, 540, and 550, platform 660, and/or architecture 700. The NE device 800 includes ingress ports 810 and receiver units (Rx) 820 for receiving data, a processor, logic unit, or CPU 830 to process the data; transmitter units (Tx) 840 and egress ports 850 for transmitting the data; and a memory 860 for storing the data. The NE device 800 may also include optical-to-electrical (OE) components and electrical-to-optical (EO) components coupled to the ingress ports 810, receiver units 820, transmitter units 840, and egress ports 850 for egress or ingress of optical or electrical signals. It should be noted that the ingress ports 810 and ingress ports 810 may be bidirectional ports and/or may be combined into a single bi-directional port in some embodiments.

The processor 830 may be implemented by hardware and software. The processor 830 may be implemented as one or more CPU chips, cores (for example, as a multi-core processor), field-programmable gate arrays (FPGAs), application specific integrated circuits (ASICs), and digital signal processors (DSPs). The processor 830 is in communication with the ingress ports 810, receiver units 820, transmitter units 840, egress ports 850, and memory 860. The processor 830 comprises a vBIOS protocol module 835, which implements at least some of the methods discussed below such as method 900, 1000, 1100, 1200, and/or 1300. In an alternative embodiment, the vBIOS protocol module 835 is implemented as instructions stored in memory 860, which are executed by processor 830, or implemented in part in the processor 830 and in part in the memory 860, for example a computer program product stored in a non-transitory memory that comprises instructions that are implemented by the processor 830. In another alternative embodiment, the vBIOS protocol module 835 is implemented on separate NEs.

The memory 860 includes one or more disks, tape drives, and solid-state drives and may be used as an over-flow data storage device, to store programs when such programs are selected for execution, and to store instructions and data that are read during program execution. The memory 860 may be volatile and non-volatile and may be read-only memory (ROM), random-access memory (RAM), ternary content-addressable memory (TCAM), and static random-access memory (SRAM).

Figure 9:
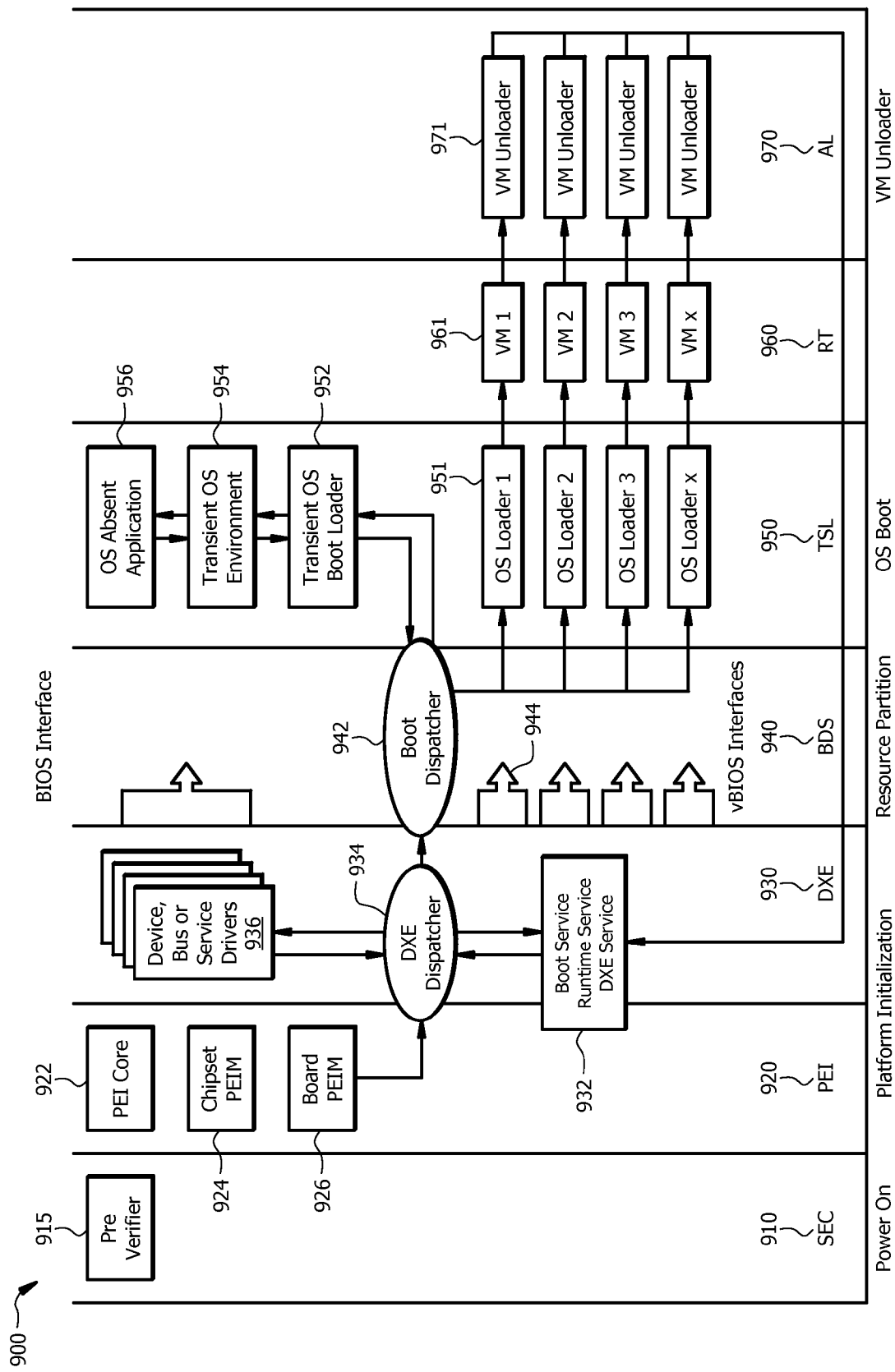
FIG. 9 is a diagram of a method of executing applications in a cloud computing architecture according to an embodiment of the disclosure.

FIG. 9 is a diagram 900 of a method of executing applications in a cloud computing architecture according to an embodiment of the disclosure. The protocol diagram 900 may be performed in the cloud computing architecture (e.g., the cloud computing architecture 500 and/or 700) when a user requests operations of various applications.

At a first phase 910, a security (SEC) check is performed by a pre-verifier 915. The pre-verifier 915 is configured to perform certain checks on the cloud computing hardware such as checks for network connections and battery status, when the cloud computing hardware is turned on. The first phase 910 is sometimes referred to as a "Power On" phase. At a second phase 920, a pre extensible firmware interface (EFI) initialization (PEI) is performed. A PEI core 922, a chipset PEI module (PEIM) 924, and a board PEIM 926 are initiated. The PEI core 922 is substantially similar to the processor cores 340 and 730 and configured to dispatch the chipset PEIM 924 and the board PEIM 926. The PEI core 922 also provides basic services for the chipset PEIM 924 and the board PEIM 926. The chipset PEIM 924 and the board PEIM 926 are executable binary modules that are loaded by the PEI core 922 to perform various tasks and initializations on a chipset and a control board, respectively. The board PEIM 926 informs a driver execution environment (DXE) dispatcher 934 after the board PEIM 926 is initialized.

At a third phase 930, a DXE is established. The DXE dispatcher 934 initiates device, bus, or service drivers 936 based on information from the board PEIM 926. The DXE dispatcher 934 is further configured to provide boot service, runtime service, and DXE service 932 and inform a boot dispatcher 942 after the DXE is established. The second phase 920 and the third phase 930 are collectively referred to as a "Platform Initialization" phase.

It should be noted that the fourth phase 940 and the fifth phase 950 may occur more than once during the booting process (e.g. iteratively) to support loading both a transient OS and a permanent OS (if any), which is not shown in FIG. 9 for clarity. The fourth phase 940 is referred to as a "Resource Partition" phase. The fifth phase 950 may be referred to as an "OS Boot" phase. During a first iteration of the fourth phase 940, boot device selection (BDS) is performed when a boot dispatcher locates and initiates a transient OS loader. The method then proceeds to a fifth phase 950, to perform a transient system load (TSL), which includes loading a transient OS. The transient OS boot loader 952 is configured to boot the transient OS. Sequentially, a transient OS environment 954 is established and OS absent applications 956 are initiated to configure the vBIOS interfaces 944.

During a second iteration of the fourth phase 940, a plurality of vBIOS interfaces 944 are created, for example, based on instructions from the orchestration element, such as orchestration element 570. Each vBIOS interface 944 is associated with a vBIOS that manages a partition of hardware resources. The boot dispatcher 942 also dispatches the vBIOS interfaces 944 to a plurality of OS loaders 951. The plurality of OS loaders 951 load OSs as needed (e.g. permanent OSs). The OSs loaded at the OS loaders 951 may be different for different vBIOS interfaces 944.

At a sixth phase 960, applications operate on the OSs during run time (RT). For example, the applications may be VMs 961. At a seventh phase 970, the applications are unloaded after completion and hardware resources used for the applications are released. Then the method 900 returns to the third phase 930 requesting a boot service, a run time service, and/or a DXE service 932. When the applications are VMs, the VMs are unloaded by VM unloaders 971. As such, the seventh phase 970 is referred to as a "VM unloader" phase. By employing method 900, resources may be allocated to various vBIOSs to operate OSs, VMs, and/or applications operating without an OS or a VM. Upon completion of the application, the resources may be released for use by other programs without restarting the system. Accordingly, resources may be dynamically allocated to operate applications without an accompanying OS and/or VM and released upon completion. Resources may also be dynamically allocated across a plurality of nodes (e.g. nodes 430) to support distributed applications without an OS, hypervisor, VM, VMM, or other virtualization systems.

Figure 10:
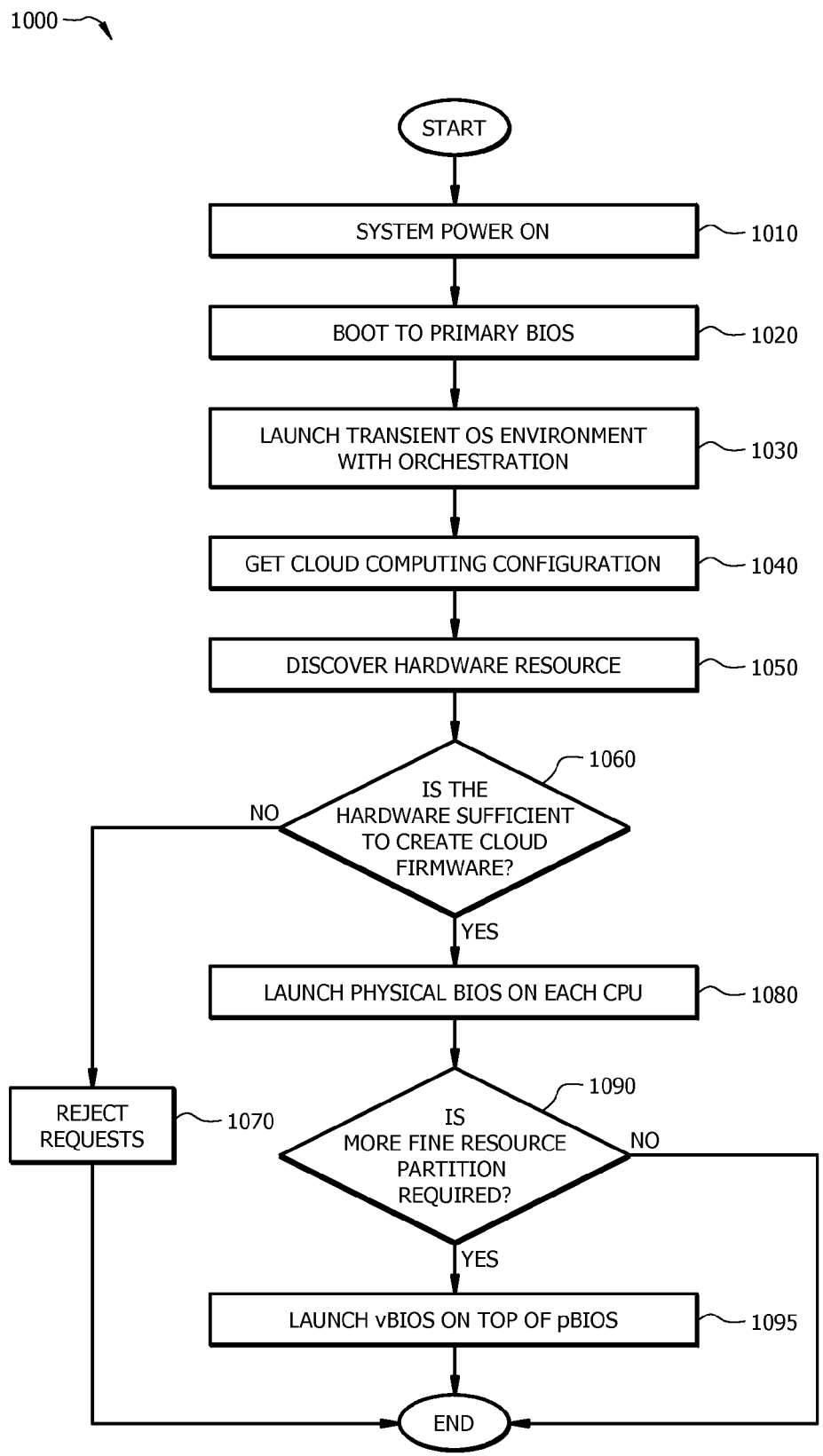
FIG. 10 is a flowchart of an embodiment of a method for creating vBIOSs according to an embodiment of the disclosure.

FIG. 10 is a flowchart illustrating a method 1000 for creating vBIOSs according to an embodiment of the disclosure. The method 1000 is implemented in a cloud computing architecture (e.g., the cloud computing architecture 500 and/or 700) when a user requests execution of various applications. For example, method 1000 may be implemented by a network node (e.g. node 430) in a cloud environment. At block 1010, system power is turned on to initialize the node. At block 1020, a primary BIOS is booted. The primary BIOS may be a pBIOS and/or other firmware (e.g., firmware 740) and may support bootstrapping of the node. The primary BIOS may be shut down after system startup in some embodiments. At block 1030, a transient OS environment is launched. The transient OS environment may act as a platform for communication with an orchestration element and may therefore provide orchestration support for the node. The transient OS environment is configured to perform certain tasks on a temporary OS for a short period of time, for example the transient OS environment may only be available until startup is complete and may be shut down before or after hardware partitioning.

At block 1040, a cloud computing configuration is obtained, for example from an orchestration element such as orchestration element 570. The configuration may be received from a remote orchestration element via a receiver or from a local orchestration element via a control board. At block 1050, hardware resources are discovered by the primary BIOS. The discovered available hardware resources may be reported to the orchestration element to support orchestration. At block 1060, the method 1000 determines whether the hardware is sufficient to create the cloud firmware, for example to serve a distributed application based on application request(s). If the hardware is sufficient to create the cloud firmware, the method 1000 proceeds to block 1070. Otherwise, the method 1000 proceeds to block 1080. At block 1070, pending request(s) are rejected due to insufficient hardware resources. Then the method 1000 ends.

At block 1080, a pBIOS is launched on each CPU to determine the available hardware resources of each CPU. The pBIOSs may be launched by the primary BIOS or may operate independently of the primary BIOS. At block 1090, the method 1000 determines whether one or more fine resource partitions (e.g. partitions of less than one CPU) are required. Specifically, if the CPUs can be allocated to support all request(s) without subdividing CPE resources, then fine resource partitions is not required. If one or more fine resource partitions are required, the method 1000 proceeds to block 1095. Otherwise, the method 1000 ends. At block 1095, vBIOSs are created and launched on the pBIOSs. Specifically, the fine resource partition partitions at least one CPU such that the CPUs cores are dedicated to more than one vBIOS, allowing a plurality of applications to maintain dedicated processing resources on a single CPU. The method 1000 then ends.

Figure 11:
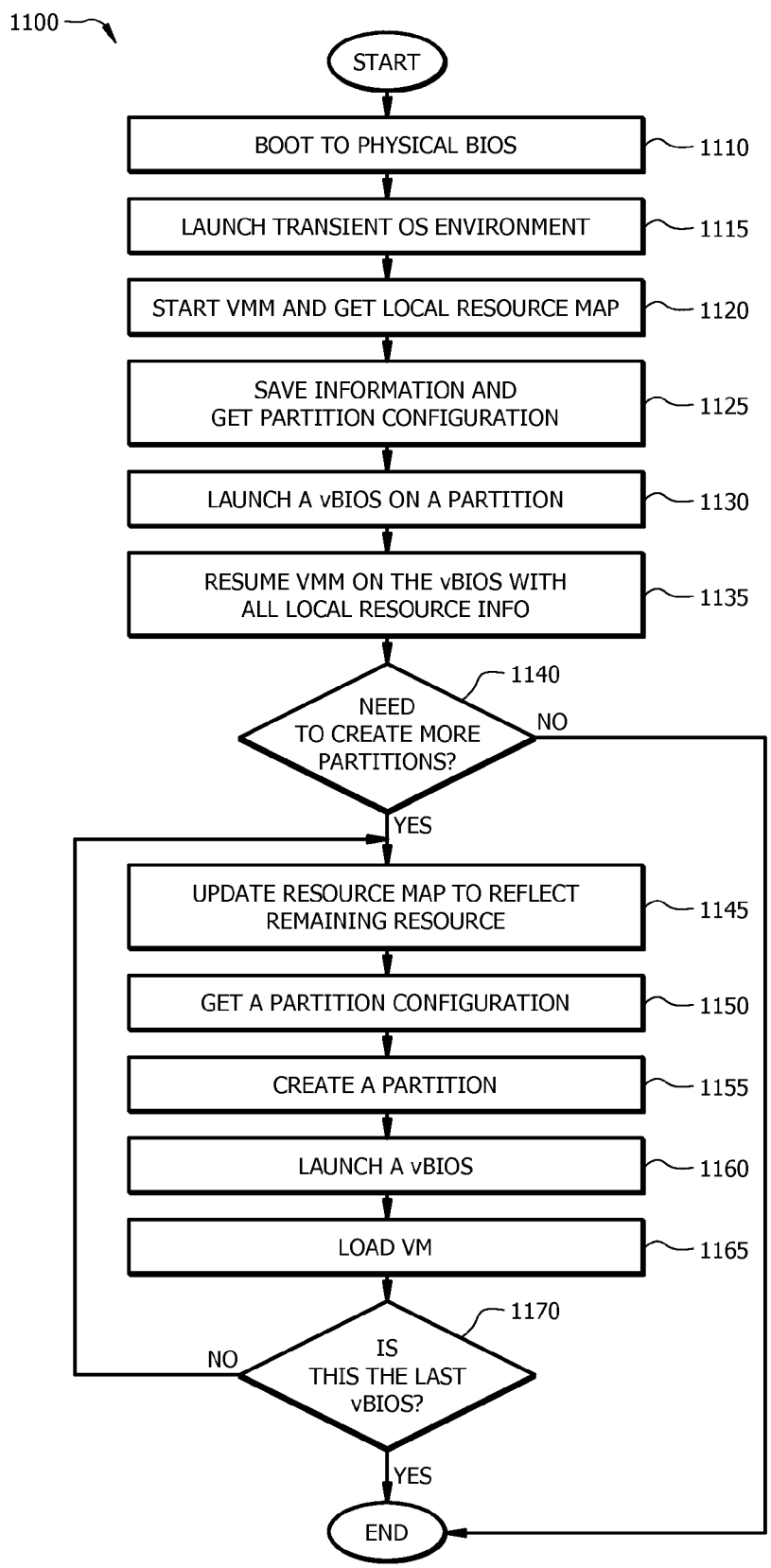
FIG. 11 is a flowchart of an embodiment of a method for managing hardware resources by launching the vBIOSs according to an embodiment of the disclosure.

FIG. 11 is a flowchart illustrating a method 1100 for managing hardware resources by launching the vBIOSs according to an embodiment of the disclosure. The method 1100 is implemented in a cloud computing architecture (e.g., the cloud computing architecture 500 and/or 700) when a user requests execution of various applications. Method 1100 may be similar to method 1000, but may also support creation of virtual machines on the vBIOS partitions. At block 1110, a physical BIOS, such as a primary BIOS, is booted in a manner similar to step 1020. At block 1115, a transient OS environment is launched in a manner similar to step 1030. At block 1120, a VMM is launched, for example in the transient OS environment. The VMM may be configured to manage a plurality of VMs. The VM may obtain a local resource map, which indicates the hardware resources of the cloud computing architecture.

At block 1125, the local resource map is saved, for example in a storage, and a partition configuration is obtained for a first (e.g. initial) vBIOS by a control board. The first partition configuration may be selected to support a first vBIOS for operating the VMM after bootstrapping is complete. At block 1130, the first vBIOS is launched on a first partition (e.g., partition 0). At block 1135, a VMM is transferred to the first vBIOS and all the local resource information is forwarded to the VMM at the first vBIOS. The transient OS and/or primary BIOS may be shutdown once the VMM is initialized at the first vBIOS. At block 1140, the method 1100 determines whether additional partitions are needed to support additional vBIOSs for VMs. If no more partitions are needed, the method 1100 ends. Otherwise, the method 1100 proceeds to block 1145. At block 1145, the resource map is updated to reflect remaining available resources not assigned to any existing partition. At block 1150, a partition configuration is obtained to support a new VM. At block 1155, a partition is created for the new VM by selecting resources from the remaining available resources determined at block 1145. At block 1160, a new vBIOS is launched to support the new VM. At block 1165, the new VM or is loaded to the new vBIOS. The new VM may then be controlled by the VMM operating on the first vBIOS, which may allow VMs and/or VMMs to operate on different dedicated cores of a CPU. At block 1170, the method 1100 determines whether the newly launched vBIOS is the last vBIOS. If the newly launched vBIOS is the last vBIOS needed to support the resource requests from one or more distributed applications, then the method 1100 ends. Otherwise, the method 1100 returns to block 1145 to create more vBIOS partitions to support more VMs. Accordingly, method 1100 allows VMM and VM operation without requiring an OS to operate the VMM or the VMs.

Figure 12:
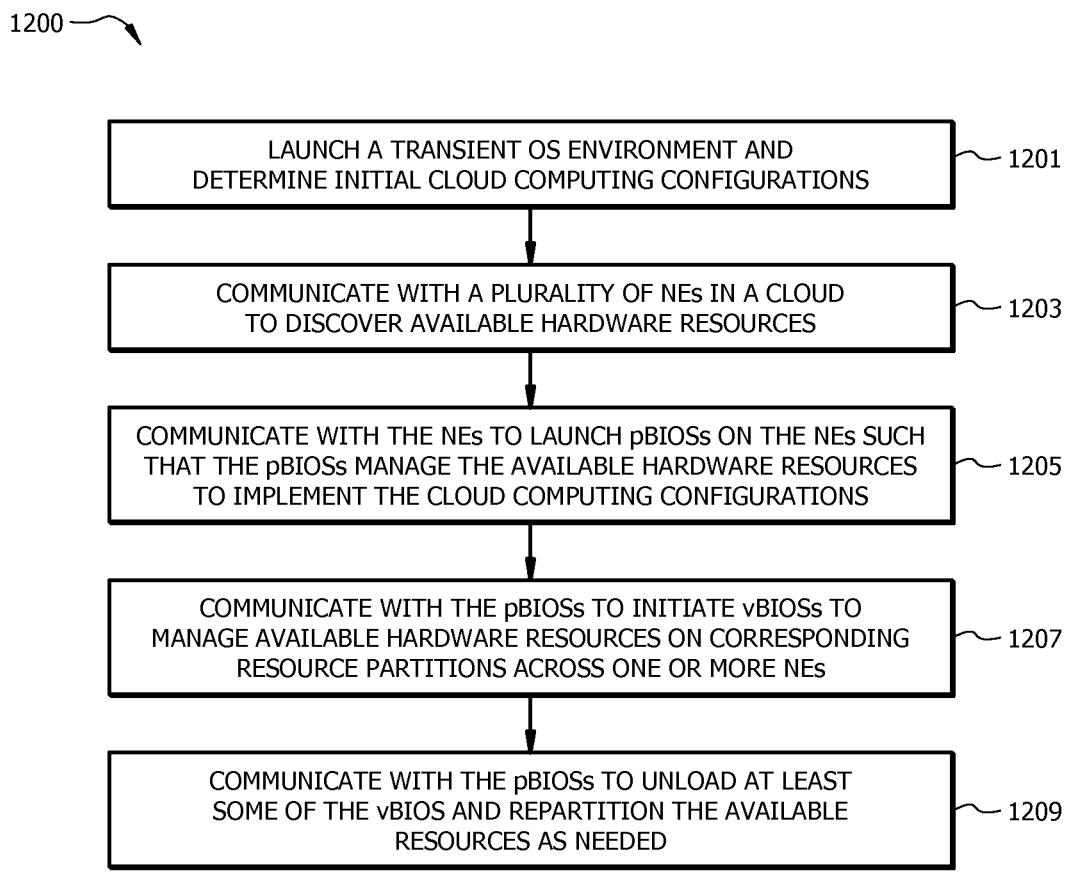
FIG. 12 is a flowchart of an embodiment of a method of managing hardware resources by an orchestration element.

FIG. 12 is a flowchart of an embodiment of a method of managing hardware resources by an orchestration element, such as orchestration element 570. Method 1200 may commence when an orchestration element is initialized. At step 1201, a transient OS environment may be launched to determine initial cloud computing configurations needed to serve one or more distributed applications. At step 1203, the method 1200 may communicate with a plurality of NEs in a cloud, such as NEs 430, to discover available hardware resources in the cloud. At step 1205, the method 1200 may communicate with the NEs (e.g. via signaling) to cause the NEs to launch pBIOSs, such as firmware 740, so that each pBIOS manages locally available hardware resources to implement the cloud computing configurations. At step 1207, the method 1200 may communicate with the pBIOSs to initiate vBIOSs, such as a vBIOS 760 and/or 780, to manage available hardware resources on corresponding resource partitions. A vBIOSs may be localized to a particular NE or distributed across a plurality of NEs to allow the distributed vBIOS to operate an application using resources from multiple nodes, for example without employing an OS, a VM, a VMM, or other virtualization. At step 1209, the method 1200 may communicate with the pBIOSs to unload at least some of the vBIOS and repartition the available resources as needed, which may allow the resources to be dynamically reallocated in a distributed manner based on application needs without a virtualization layer.

Figure 13:
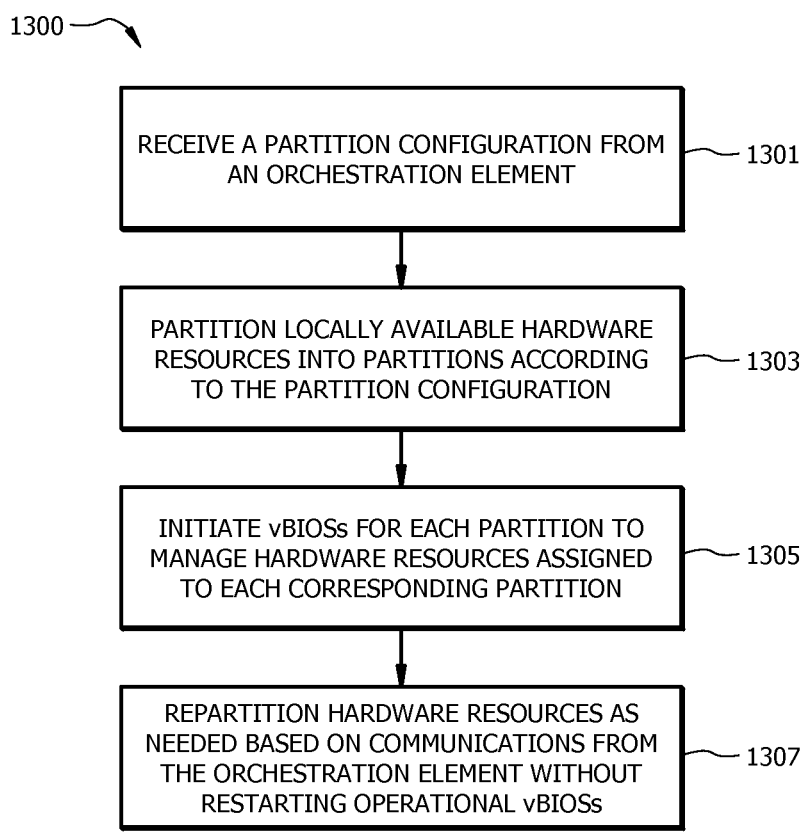
FIG. 13 is a flowchart of an embodiment of a method of managing hardware resources by a NE based on configurations from an orchestration element.

FIG. 13 is a flowchart of an embodiment of a method of managing hardware resources by a NE, such as NEs 430, based on configurations from an orchestration element, such as orchestration element 570. Method 1300 may commence when an NE and/or a cloud (e.g. cloud 440) is initialized. At step 1301, a partition configuration may be received from an orchestration element. At step 1303, locally available hardware resources on the NE (e.g. processor cores, CPUs, storage, network communication devices, etc.) may be partitioned according to the partition configuration. At step 1305, a vBIOSs, such as a vBIOS 760 and/or 780, may be initiated for each partition to manage hardware resources assigned to each corresponding partition. Each vBIOS may then employ assigned resources to execute an application in a local or a distributed manner (e.g. by communicating with a corresponding vBIOS on another NE). At step 1307, the hardware resources may be repartitioned as needed based on communications from the orchestration element without restarting operational vBIOSs. Accordingly, each application may be allocated specialized hardware resources dynamically without requiring an OS, hypervisor, or a virtualization layer.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network element (NE) comprising:
a receiver configured to couple to a cloud network; and
a multi-core central processing unit (CPU) coupled to the receiver and configured to:
receive a first partition configuration from an orchestration element;
partition a plurality of processor cores into a plurality of processor core partitions according to the first partition configuration;
initiate a plurality of virtual basic input/output systems (vBIOSs) generated by the orchestration element to form a plurality of computing subsystems within the NE, wherein each vBIOS manages a processor core partition, wherein at least one vBIOS is configured to run an application without booting a corresponding operating system (OS) to manage the application; and
execute a distributed application across the plurality of computing subsystems, wherein the distributed application transmits hardware resource requests of applications executing in the plurality of computing subsystems to the orchestration element.

2. The NE of claim 1, wherein at least one vBIOS is distributed over a plurality of NE chassis such that the at least one vBIOS manages both a first processor core in a corresponding processor core partition on the NE and a second processor core in a corresponding remote processor core partition in a remote NE chassis coupled to the NE via the receiver.

3. The NE of claim 1, wherein the CPU comprises a physical BIOS, and wherein the physical BIOS is configured to partition the processor cores and initiate the plurality of vBIOSs based on the first partition configuration from the orchestration element.

4. The NE of claim 3, wherein the CPU is further configured to receive a second partition configuration from the orchestration element, and wherein the physical BIOS is further configured to unload at least one of the vBIOS without restarting the CPU based on the second partition configuration.

5. The NE of claim 4, wherein the physical BIOS is further configured to:
repartition at least one of the plurality of processor core partitions according to the second partition configuration; and
initiate a vBIOS in each repartitioned processor core partition.

6. The NE of claim 5, wherein at least one of the vBIOSs continues to operate on a corresponding processor core partition during repartitioning by the physical BIOS.

7. The NE of claim 1, wherein the receiver is configured to receive the first partition configuration from the orchestration element, wherein the CPU receives the first partition configuration via the receiver, and wherein the NE does not comprise the orchestration element.

8. The NE of claim 1, wherein the orchestration element operates at least in part on the NE and is distributed across the cloud network coupled to the NE via the receiver.

9. A method implemented in an orchestration element, the method comprising:
launching, via a processor in the orchestration element, a transient operating system environment;

determining, via the processor, a first cloud computing configuration comprising a plurality of computing subsystems formed within a plurality of network elements (NEs) in a cloud;

communicating, via a transmitter in the orchestration element, with the plurality of network elements (NEs) in the cloud to discover available hardware resources on the NEs;

communicating, via the transmitter, with the NEs to launch a plurality of physical basic input/output system (pBIOSs) on the NEs such that the pBIOSs manage the available hardware resources to implement the first cloud computing configuration including implementing a distributed application across the plurality of computing subsystems, wherein the distributed application transmits hardware resource requests of applications executing in the plurality of computing subsystems to the orchestration element; and generating, via the processor, a plurality of virtual BIOSs (vBIOSs) such that each vBIOS corresponds to available hardware resources in a corresponding resource partition, wherein at least one vBIOS is configured to run an application without booting a corresponding operating system (OS) to manage the application.

10. The method of claim 9, further comprising:
communicating, via the transmitter, with a first of the pBIOSs on a first of the NEs to partition available hardware resources on the first NE into a plurality of resource partitions according to the first cloud computing configuration; and communicating, via the transmitter, with the first pBIOS to initiate the plurality of vBIOSs such that each vBIOS manages the available hardware resources in the corresponding resource partition.

11. The method of claim 10, further comprising:
communicating, via the transmitter, with a second of the pBIOSs on a second of the NEs to partition available hardware resources on the second NE into a second plurality of resource partitions according to the first cloud computing configuration; and communicating, via the transmitter, with the second pBIOS to initiate a first of the vBIOSs such that the first vBIOS manages available hardware resources on both the first NE and the second NE.

12. The method of claim 10, wherein at least one of the vBIOS is configured to operate a virtual machine (VM) without booting a corresponding operating system (OS).

13. The method of claim 10, further comprising:
determining, via the processor, a second cloud computing configuration which is different from the first cloud configuration; and communicating, via the transmitter, with the first pBIOS to unload at least some of the vBIOS and repartition the first NE available resources according to the second cloud computing configuration without restarting the first NE.

14. The method of claim 13, wherein at least some of the vBIOS continue to operate during repartitioning.

15. A method implemented in a network element (NE), the method comprising:
receiving, via a port in the NE, a partition configuration from an orchestration element;

partitioning, by a processor in the NE, locally available hardware resources into a plurality of partitions according to the partition configuration;

initiating, by the processor, a plurality of virtual basic input/output systems (vBIOSs) generated by the orchestration element such that each vBIOS manages all hardware resources assigned to an associated partition to form a plurality of computing subsystems within the NE, wherein at least one vBIOS in the plurality of vBIOSs is configured to run an application without booting a corresponding operating system (OS) to manage the application; and executing, by the processor, a distributed application across the plurality of computing subsystems, wherein the distributed application transmits hardware resource requests of applications executing in the plurality of computing subsystems to the orchestration element.

16. The method of claim 15, wherein at least one of the vBIOS is configured to boot a virtual machine (VM) without booting a corresponding operating system (OS).

17. The method of claim 16, wherein the at least one vBIOS is configured to boot the VM without booting a local virtual machine manager (VMM).

18. The method of claim 15, wherein at least one vBIOS is distributed over a plurality of NE chassis such that the at least one vBIOS manages both hardware resources in a corresponding partition on the NE and hardware resources in a corresponding remote partition in a remote NE chassis.

19. The method of claim 15, further comprising repartitioning, via the processor, the locally available hardware resources based on communications from the orchestration element, wherein at least one of the vBIOS remains operational during repartitioning of the locally available hardware resources.

* * * * *